(12) United States Patent
Kopelman et al.

(10) Patent No.: US 12,127,898 B2
(45) Date of Patent: Oct. 29, 2024

(54) SYSTEMS AND METHODS FOR THE DESIGN AND FABRICATION OF PROVISIONAL AND PERMANENT CROWNS

(71) Applicant: ALIGN TECHNOLOGY, INC., San Jose, CA (US)

(72) Inventors: Avi Kopelman, Palo Alto, CA (US); Moti Ben Dov, Tel Mond (IL)

(73) Assignee: ALIGN TECHNOLOGY, INC., San Jose, CA (US)

( * ) Notice: Subject to any disclaimer, the term of this patent is extended or adjusted under 35 U.S.C. 154(b) by 150 days.

(21) Appl. No.: 17/810,683

(22) Filed: Jul. 5, 2022

(65) Prior Publication Data

US 2023/0008156 A1 Jan. 12, 2023

Related U.S. Application Data

(60) Provisional application No. 63/203,083, filed on Jul. 7, 2021.

(51) Int. Cl.
*A61C 13/00* (2006.01)
*A61C 5/77* (2017.01)
*A61C 9/00* (2006.01)

(52) U.S. Cl.
CPC ............ *A61C 13/0004* (2013.01); *A61C 5/77* (2017.02); *A61C 9/0053* (2013.01)

(58) Field of Classification Search
None
See application file for complete search history.

(56) References Cited

U.S. PATENT DOCUMENTS

| | | |
|---|---|---|
| 6,152,731 A | 11/2000 | Jordan et al. |
| 6,334,853 B1 | 1/2002 | Kopelman et al. |
| 6,845,175 B2 | 1/2005 | Kopelman et al. |
| 6,957,118 B2 | 10/2005 | Kopelman et al. |
| 7,112,065 B2 | 9/2006 | Kopelman et al. |
| 7,220,124 B2 | 5/2007 | Taub et al. |
| 7,236,842 B2 | 6/2007 | Kopelman et al. |
| 7,333,874 B2 | 2/2008 | Taub et al. |
| 7,361,020 B2 | 4/2008 | Abolfathi et al. |
| 7,442,040 B2 | 10/2008 | Kuo |
| 7,536,234 B2 | 5/2009 | Kopelman et al. |
| 7,555,403 B2 | 6/2009 | Kopelman et al. |
| 7,766,658 B2 | 8/2010 | Tricca et al. |
| 7,862,336 B2 | 1/2011 | Kopelman et al. |
| 7,871,269 B2 | 1/2011 | Wu et al. |
| 7,947,508 B2 | 5/2011 | Tricca et al. |
| 8,092,215 B2 | 1/2012 | Stone-Collonge et al. |
| 8,244,028 B2 | 8/2012 | Kuo et al. |
| 8,382,474 B2 | 2/2013 | Boltanski et al. |

(Continued)

*Primary Examiner* — Kyle Zhai
(74) *Attorney, Agent, or Firm* — FisherBroyles, LLP

(57) ABSTRACT

A method for preparing a tooth crown may include generating a 3D model of an external surface of a patient's tooth and generating a 3D model of an external surface of a first crown based on the 3D model of the external surface of the patient's tooth. The method may also include preparing the patient's tooth to receive the first crown while generating the 3D model of the external surface. A 3D model of the prepared tooth my be generated. A 3D model of an internal surface of the first crown may also be generated. The 3D model of the external surface and the 3D model of the internal surface may form a 3D model of the first crown.

20 Claims, 7 Drawing Sheets

(56) References Cited

U.S. PATENT DOCUMENTS

| | | |
|---|---|---|
| 8,509,932 B2 | 8/2013 | Kopelman |
| 8,807,999 B2 | 8/2014 | Kuo et al. |
| 9,375,298 B2 | 6/2016 | Boronkay et al. |
| 9,408,679 B2 | 8/2016 | Kopelman |
| 9,492,243 B2 | 11/2016 | Kuo |
| 9,763,758 B2 | 9/2017 | Kopelman |
| 10,016,262 B2 | 7/2018 | Sabina et al. |
| 10,952,816 B2 | 3/2021 | Kopelman |
| 2005/0106529 A1 | 5/2005 | Abolfathi et al. |
| 2006/0115785 A1 | 6/2006 | Li et al. |
| 2008/0138767 A1 | 6/2008 | Kuo et al. |
| 2008/0286716 A1 | 11/2008 | Sherwood |
| 2008/0286717 A1 | 11/2008 | Sherwood |
| 2013/0158694 A1* | 6/2013 | Rubbert ............... A61C 9/0046 700/98 |
| 2014/0229145 A1* | 8/2014 | Van Lierde ........ A61C 13/0004 703/1 |
| 2016/0239631 A1* | 8/2016 | Wu ........................ G16Z 99/00 |

* cited by examiner

SYSTEMS AND METHODS FOR THE DESIGN AND FABRICATION OF PROVISIONAL AND PERMANENT CROWNS

RELATED APPLICATIONS

This application claims the benefit under 35 U.S.C. § 119(e) of U.S. Provisional Patent Application No. 63/203,083, filed Jul. 7, 2021, which is incorporated, in its entirety, by this reference.

BACKGROUND

Permanent crowns are time-consuming to produce. In order to provide some measure of relief to patients needing crowns, dentists often fit a patient with a temporary crown while waiting for the permanent crown to be fabricated and delivered. However, current temporary crowns in the process for designing and fabricating them are less than ideal in many ways. The process of designing and fabricating a temporary crown may itself be a time-consuming process that involves multiple trips to the dentist for preparing the patient's tooth and designing, fabricating, and fitting the temporary crown to the patient's tooth.

SUMMARY

As will be described in greater detail below, the present disclosure describes various systems and methods for designing and fabricating provisional and permanent crowns. The systems and methods disclosed herein may be used to prepare a patient's tooth, design, fabricate, and fit the temporary crown to the patient's prepared tooth in a single office visit.

In addition, the systems and methods described herein may improve the functioning of a computing device and related systems by reducing computing resources and overhead for acquiring and storing updated patient data, thereby improving processing efficiency of the computing device over conventional approaches. These systems and methods may also improve the field of dental treatment, including prosthodontics and orthodontics, by analyzing data and carrying out methods that lead to more efficient use of dental resources and more timely provision of dental crowns.

A method for preparing a tooth crown may include generating a 3D model of an external surface of a patient's tooth, generating a 3D model of an external surface of a first crown based on the model of the external surface of the patient's tooth, preparing the patient's tooth to receive the first crown while generating the 3D model of the external surface, generating a 3D model of the prepared tooth, and generating a 3D model of an internal surface of the first crown, wherein the 3D model of the external surface and the 3D model of the internal surface form a 3D model of the first crown.

Generating the 3D model of the external surface may include scanning an external surface of the patient's tooth. In some embodiments, generating the 3D model of the external surface may include scanning an external surface of a corresponding tooth of the patient on an opposite side of a patient's arch relative to the patient's tooth.

In some embodiments, the method may include fabricating the first crown. In some embodiments, fabricating may include fabricating an external surface of the first crown while the patient's tooth is prepared. In some embodiments, fabricating may include fabricating an internal surface of the first crown.

In some embodiments, the method may include fitting the first crown to the prepared tooth and scanning the physical inner surface of the first crown after fitting the first crown to the prepared tooth to generate a 3D model of the physical inner surface of the first crown.

In some embodiments, the method may include updating the 3D model of the first crown based on the 3D model of the physical inner surface of the first crown. In some embodiments, the method may include generating instructions for fabricating a second crown based on the updated 3D model of the first crown.

In some embodiments, the first crown may be a temporary crown and the second crown is a permanent crown.

In some embodiments, a method for preparing a tooth crown may include generating a 3D model of an external surface of a patient's tooth, generating a 3D model of an external surface of a first crown based on the model of the external surface of the patient's tooth, generating a 3D model of an internal surface of the first crown, preparing the patient's tooth to receive the first crown while generating the 3D model of the external surface, fitting a physical first crown to the patient's tooth, generating a 3D model of the internal surface of the physical first crown, wherein a 3D model of a second crown is based on the 3D model of the internal surface of the physical first crown and the 3D model of the external surface of the first crown, and generating instructions for fabricating a physical second crown based on the 3D model of a second crown.

In some embodiments, generating the 3D model of the external surface includes scanning an external surface of the patient's tooth. In some embodiments, generating the 3D model of the external surface includes scanning an external surface of a corresponding tooth of the patient on an opposite side of a patient's arch relative to the patient's tooth.

In some embodiments, the method may include generating instructions for fabricating the first crown. In some embodiments, fabricating includes fabricating an external surface of the first crown while the patient's tooth is prepared. In some embodiments, fabricating includes fabricating an internal surface of the first crown.

In some embodiments, the method may include updating the 3D model of the first crown based on the 3D model of the physical inner surface of the first crown. In some embodiments, the method may include fabricating a physical second crown based on the 3D model of the second crown.

In some embodiments, the first crown may be an eggshell crown and the second crown may be a permanent crown. In some embodiments, the 3D model of the internal surface of the first crown may be based on the 3D model of the external surface of the first crown.

INCORPORATION BY REFERENCE

All patents, applications, and publications referred to and identified herein are hereby incorporated by reference in their entirety and shall be considered fully incorporated by reference even though referred to elsewhere in the application.

BRIEF DESCRIPTION OF THE DRAWINGS

A better understanding of the features, advantages and principles of the present disclosure will be obtained by reference to the following detailed description that sets forth illustrative embodiments, and the accompanying drawings of which.

DETAILED DESCRIPTION

The following detailed description and figures provide a better understanding of the features and advantages of the inventions described in the present disclosure in accordance with the embodiments disclosed herein. Although the detailed description and figures include many specific embodiments, these are provided by way of example only and should not be construed as limiting the scope of the inventions disclosed herein.

The design and production of a temporary or permanent crown may involve the participation of a dental professional such as a dentist, orthodontists, or other dental practitioner scanning and modeling a patient's dentition at a dental clinic and then sending a model of the patient's dentition to a dental lab for design and production of a crown. A dental clinic refers to the locations where a dental practitioner meets in interacts with a paten, in particular a clinic, in which there is interaction between a dental patient and a dental practitioner. While dental practitioner or dental professional typically refers to a dentist, doctor or dental technician, it also includes other caregivers, including for example dental surgeons, orthodontists, prosthodontists, dental assistants or any other caregiver or professional that may interact with a dental patient during the course of a dental treatment, or that may be involved in determining, preparing or providing dental treatment to a patient, particularly prosthodontic treatment and/or orthodontic treatment. While dental patient, also referred to herein as a patient, typically refers to a person using the dental services of a dental practitioner.

Figure 1:
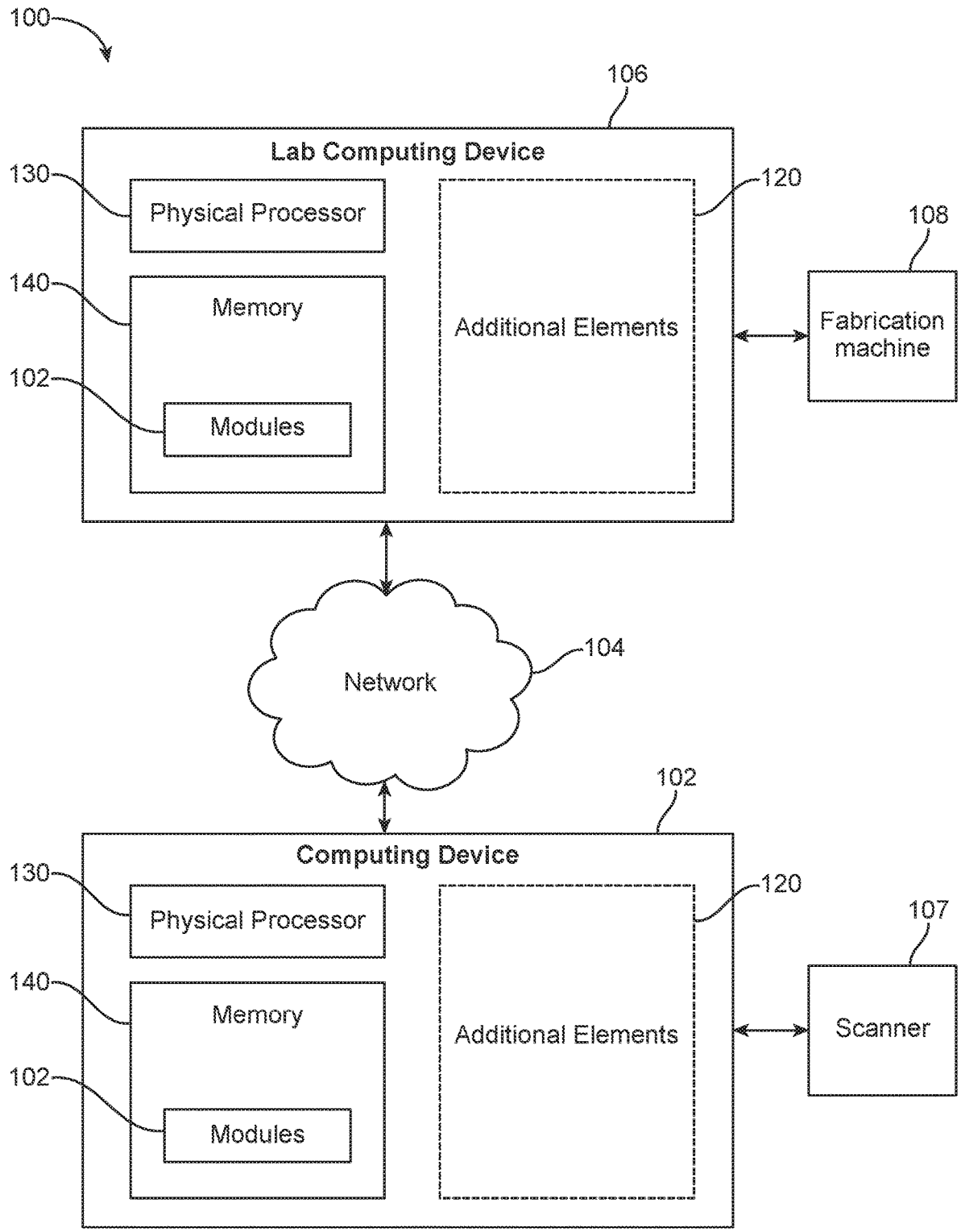
FIG. 1 shows a block diagram of an example system for designing and fabricating provisional and permanent crowns, in accordance with some embodiments.

As shown in FIG. 1, a system 100 for the design and fabrication of temporary and permanent crowns may include one or more clinic computing devices 105 in communication with one or more lab computing devices 106 via a network 104. In one example, all or a portion of the functionality of modules 102 may be performed by clinic computing device 105, lab computing device 106, and/or any other suitable computing system. As will be described in greater detail below, one or more of modules 102 from FIG. 1 may, when executed by at least one processor of clinic computing device 105 and/or lab computing device 106, enable clinic computing device 105 and/or lab computing device 106 to provide for the design and fabrication of temporary and permanent crowns. For example, and as will be described in greater detail below, one or more of modules 102 may cause clinic computing device 105 and/or lab computing device 106 to carry out the steps of a method according to FIGS. 3, 4, and/or 5.

Clinic computing device 105 and lab computing device 106 generally represents any type or form of computing device capable of reading computer-executable instructions and are capable of storing and analyzing data. Clinic computing device 105 may be, for example, an intraoral scanner and 3D treatment planning computer or may include an intraoral scanner or be operably connected to an intraoral scanner. Additional examples of clinic computing device 105 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Additional examples of clinic computing device 105 and lab computing device 106 include, without limitation, security servers, application servers, web servers, storage servers, and/or database servers configured to run certain software applications and/or provide various security, web, storage, and/or database services. Although illustrated as single entities in FIG. 1, clinic computing device 105 and lab computing device 106 may include and/or represent a plurality of computing devices that work and/or operate in conjunction with one another.

As illustrated in FIG. 1, clinic computing device 105 and/or lab computing device 106 may include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, clinic computing device 105 and/or lab computing device 106 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, the clinic computing device 105 may include a scanner 107 and the lab computing device 106 may include a fabrication machine 108, both of which are described in greater detail herein, below.

Network 104 generally represents any medium or architecture capable of facilitating communication or data transfer. In one example, network 104 may facilitate communication between clinic computing device 105 and lab computing device 106. In this example, network 104 may facilitate communication or data transfer using wireless and/or wired connections. Examples of network 104 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

The lab computing device 106 may be connected in electronic communication with a fabrication machine 108. The fabrication machine 108 may be an additive manufacturing machine, such as 3D printer, which may deposit or form material into the shape of the permanent or temporary crown, or a subtractive manufacturing machine, such as milling machine, that may mill or grind material to remove it from an existing material blank.

The clinic computing device 105 may be connected in electronic communication with a scanner 107. The scanner 107 may be an intraoral scanner and may include a probe, such as a hand-held probe, for optically capturing three dimensional structures from within the intraoral cavity, such as by confocal focusing of an array of light beams. The scanner 107 may also include other components such as optical components, an accelerometer, communication components, a gyroscope, processing devices, and so on. One example of an intraoral scanner is the iTero® intraoral digital scanner manufactured by Align Technology, Inc.

Additional elements 120 generally represents any type or form of data that may be used for designing and fabricating temporary and permanent crown, as discussed below, at with reference to FIG. 2.

Example system 100 in FIG. 1 may be implemented in a variety of ways. For example, all or a portion of example system 100 may represent portions of example system 200 in FIG. 2.

Figure 2:
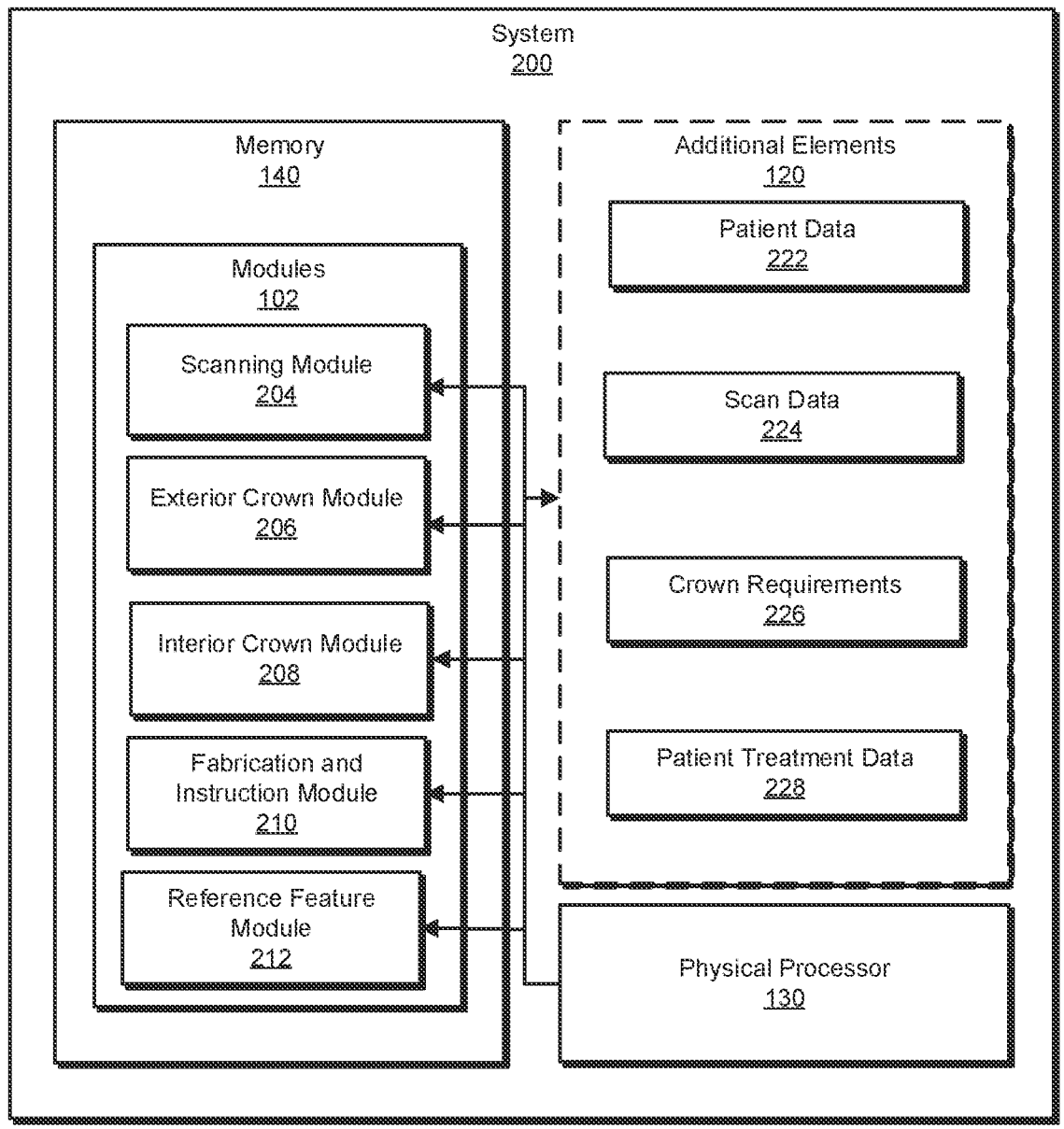
FIG. 2 shows a block diagram of an example system for designing and fabricating provisional and permanent crowns, in accordance with some embodiments.

FIG. 2 is a block diagram of an example system 200 for the design and fabrication of a temporary or permanent crown. As illustrated in this figure, example system 200 may include one or more modules 102 for performing one or more tasks. As will be explained in greater detail below, modules 102 may include an scanning module 204, an exterior crown module 206, an interior crown module 208, a fabrication and instruction module 210, and a reference feature module 212. Although illustrated as separate elements, one or more of modules 102 in FIG. 2 may represent portions of a single module or application.

In certain embodiments, one or more of modules 102 in FIG. 2 may represent one or more software applications or programs that, when executed by a computing device, may cause the computing device and associated hardware to perform one or more tasks. For example, and as will be described in greater detail below, one or more of modules 102 may represent modules stored and configured to run on one or more computing devices, such as the devices illustrated in FIG. 1 (e.g., clinic computing device 105 and/or lab computing device 106). One or more of modules 102 in FIG. 2 may also represent all or portions of one or more special-purpose computers configured to perform one or more tasks.

The scanning module 204 running on computing device 105 may communicate with the scanner 107 to generate an intraoral scan of the patient's dentition. The scanning module 204 may provide a user interface that is shown on a display, where the user interface enables the dental practitioner to interact with a user interface associated with scanning module 204 through manipulation of graphical elements such as graphical icons and visual indicators such as buttons, menus, and so on. The scanning module 204 may include a number of modes, such as a scanning mode, a processing mode, and a delivery mode.

The scan mode allows the dental practitioner to capture images and/or video of a dental site of the patient's dentition, such as for lower arch, upper arch, bite segment, and/or a prepared tooth. The images and/or video may be used to generate a virtual 3D model of the dental site. While in the scan mode, scanning module 204 may register and stitch together intraoral images from the intraoral scanner 107 and generate a digital virtual 3-D model of a dental arch or a portion of a dental arch that has been scanned thus far.

During the scan mode, the scanning module 204 may provide the virtual 3-D model or a portion thereof to the display which includes portions of the dental arch that have been scanned.

Once an intraoral scan is complete, or in some embodiments, during the scanning mode, scanning module 204 may also enter an image processing mode. While in the image processing mode, the scanning module 204 may process the intraoral scan data from the one or more scans of the various segments to generate a virtual 3D model of a scanned dental site.

Once the scans are complete, a delivery mode allows the dental practitioner to send the scans and/or virtual 3D model out to the lab computing device to process the scans or 3D model in order to prepare a crown.

The exterior crown module 206 generates the exterior surface model of a crown. The exterior crown module 206 receives the 3D scan and/or virtual 3D model generated chair side by the dental professional and then, based on the 3D scans or virtual 3D model of the patient's tooth, generates a three-dimensional model of the exterior surface of a crown. The generated service may be for a temporary and/or permanent crown. In some embodiments, the exterior crown module 206 may make adjustments to the exterior surface of the crown based on the 3D scan or 3D virtual model. For example, in some embodiments the crown may be larger or smaller than the patient's original tooth. In some embodiments, the exterior crown module 206 adjust the size and/or shape of the crown in order to provide appropriate proximal fit with adjacent teeth and appropriate interproximal distances or contacts between adjacent teeth. In some embodiments, the tooth cusps and occlusal surfaces of the 3D scan and the corresponding exterior surface of the crown may be adjusted in order to correct or improve the patient's bite and contact with teeth of an opposing arch. For example, the crown should be shaped such that there are no interfering contacts with the opposing arch.

The exterior crown module 206 may also generate other features of the crown. For example, the exterior crown module may determine the color of the exterior surface of the crown in order for the permanent or temporary crown to match the color of the patient's teeth, such as the patient's permanent teeth that are adjacent to the planned location of the prosthetic crown or tooth. In some embodiments, the exterior crown module 206 generates a color map for the crown. A color map may define the color for one or more locations on the crown.

In some embodiments, the exterior crown module 206 may generate an exterior surface texture for the temporary or permanent crown. The exterior surface texture of a tooth or crown influences surface reflections and other properties of the tooth or crown. In order to produce a crown that matches the patient's existing teeth, the exterior crown module 206 may generate a surface texture as part of the exterior surface model of the crown.

In some embodiments, the exterior crown module 206 may also generate information related to the translucency of the crown. The translucency of the patient's tooth influences how light is absorbed and reflected from the tooth. By matching the translucency of the patient's existing teeth, whether for a permanent or temporary prosthetic, the exterior crown module 206 may aid in producing a crown that more closely matches the patient's existing teeth. In some embodiments, the exterior crown module 206 generates a translucency map for the crown. A translucency map may define the translucency for one or more locations on the crown.

The output of the exterior crown module 206 may be a 3D model of the exterior surface of a temporary or permanent crown.

The interior crown module 208 generates the interior surface or intaglio and margin line model of a temporary or permanent crown. After a patient's tooth is prepared for receiving a crown, usually by removing tooth material to form a prepared tooth stump with a shoulder or margin line near or below a gingiva, a new 3D scan and/or model of the surface of the patient's prepared tooth is made. The interior crown module 208 may generate an interior surface or pocket of the crown based on the new 3D scan and/or model of the surface of the patient's prepared tooth that matches or is a close match to the exterior shape of the patient's prepared tooth. In some embodiments, the interior crown module 208 may generate a margin line on the crown based on the new 3D scan and/or model of the patient's prepared tooth that matches or is a close match to the exterior shape of the margin line of the patient's prepared tooth.

The shape of the interior surface or pocket of the crown is generated such that the permanent crown closely matches the shape of the patient's prepared tooth. In some embodiments, the shape of the interior surface or pocket of the crown may be generated with a surface that is offset from the shape of the patient's prepared tooth. The offset may be generated in order to account for adhesive or other bonding material that bonds the permanent or temporary crown to the patient's prepared tooth. Closely matching the shape of the pocket or interior surface of the crown to the exterior surface of the prepared tooth increases the strength and longevity of the crown because biting forces applied to the crown are distributed over the interior surface of the crown and the patient's prepared tooth. Closely matching the shape of the patient's prepared tooth also aids in preventing or minimizing the formation of unwanted bacteria between the crown and the prepared tooth.

The interior crown module 208 may generate the margin line of the permanent or temporary crown such that the permanent or temporary crown creates a seal with the patient's prepared tooth. Closely matching the shape of the margin line of the crown to the margin line of the exterior surface of the patient's tooth also increases the strength and longevity of the crown and aids in preventing or minimizing the formation of unwanted bacteria and also provides a more appropriately aesthetic looking crown.

The interior crown module 208 may also take into account the location of the exterior surfaces of adjacent teeth. For example, the interior crown module may take into account the positions of adjacent teeth in order to account for the insertion direction of the crown on to the patient's prepared tooth. In some embodiments, the location of adjacent teeth and the shape of the prepared tooth may prevent easy insertion of the crown on to the patient's prepared tooth. For example, interference from adjacent teeth may limit the direction from which the crown may be inserted. Accordingly, the interior surface of the crown may be shaped to allow for insertion of the crown without interference from adjacent teeth. In some embodiments, the prepared tooth may have undercuts that if modeled on the interior surface of the temporary or permanent crown may prevent the temporary or permanent crown from being inserted onto the prepared tooth. Accordingly, the interior crown module 208 may account for those undercuts by removing the resulting prominences that would otherwise project from the interior surface of the temporary or permanent crown.

The output of the interior crown module 206 may be a 3D model of the interior surface of a temporary or permanent crown. The 3D model of the interior surface of the temporary or permanent crown, together with the 3D model of the exterior surface of the of the temporary crown, may form a 3D model of the temporary or permanent crown.

The fabrication and instruction module 210 may generate instructions for fabricating a provisional or permanent crown. In some embodiments, the fabrication and instruction module 210 controls a fabrication machine for fabricating a provisional or permanent crown. In some embodiments, fabrication and instruction module 210 may generate instructions that when read by a fabrication machine to cause the fabrication machine to fabricate the provisional or permanent crown. The instructions may be generated to control the direct fabrication of the provisional or permanent crown such as through additive manufacturing, such as 3D printing, or through subtractive manufacturing techniques such as milling or grinding. The instructions may be in a machine and/or human readable format, such as G-code or other computer numerical control programming languages.

In some embodiments, the fabrication and instruction module 210 may generate instructions for fabricating both the exterior surface and interior surface of the permanent or temporary crown based on a 3D model of the temporary or permanent crown. In some embodiments, the fabrication and instruction module 210 may generate instructions for fabricating the exterior surface of the permanent or temporary crown separately from the instructions for generating the interior surface of the permanent or temporary crown. For example, the fabrication and instruction module 210 may generate instructions for fabricating the exterior surface of the permanent or temporary crown based on a 3D model of the of the exterior surface of the crown before the 3D model of the interior surface of the crown has been generated. Then, after the 3D model of the interior surface of the crown has been generated, the fabrication and instruction module 210 may separately generate instructions for fabricating the interior surface of the temporary or permanent crown.

The reference future module 212 may generate reference features for aligning a permanent or temporary crown with the patient's adjacent teeth and/or teeth of the patient's opposing jaw. The reference features may be generated to be part of the 3D model of the temporary or permanent crown. In some embodiments, the reference features may be generated as a separate 3D model. In some embodiments the reference future module 212 uses the three-dimensional model of the exterior surface of the permanent or temporary crown to generate a first portion of the reference features and uses the 3D scan data or 3D models of adjacent or opposing teeth to generate a second portion of the reference features. The reference features may match or otherwise mate with the temporary or permanent crown and/or the surfaces of the adjacent or opposing teeth. The reference features may be used to aid in placing the temporary or permanent crown in a predetermined position relative to the patient's adjacent or opposing teeth.

In some embodiments, the reference future module 212 may generate reference features with a cavity that receives cusps of the crown and adjacent teeth to align the crown with the adjacent teeth. In some embodiments, the reference future module 212 may generate reference features with a surface shape that mirrors the surface shape of the occlusal surfaces of the crown and adjacent teeth. In some embodiments, the refence feature module 212 may generate reference features that are separate from the crown. In some embodiments, the reference features may be unitary with the crown and be frangible such that they may be broken away from the crown after the crown is secured to the prepared tooth.

As illustrated in FIG. 2, example system 200 may also include one or more additional elements 120, such as patient data 222, scan data 224, crown requirements 226, and patient treatment data 228. Patient data 222 may include data collected from patients, such as patient historical data, historic patient scans, patient information, etc. Scan data 224 may include one or more two-dimensional or three-dimensional models of the patient's anatomy such as their face and intraoral structure, including scans of their dentition, prepared teeth, and teeth adjacent to a prepared tooth. The scan data 224 may include digital representations of a patient's teeth. The digital representation, such as the two-dimensional or three-dimensional models may include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.). Crown requirements 226 may include data used for the design and fabrication of a temporary or permanent crown, such as crown material type, crown surface finish, crown color, the dimensions of a crown, the name of the tooth that the crown is replacing, and other information used in the design and fabrication of a temporary or permanent crown. Patient treatment data 228 may include data used for treating patients, such as treatment plans, state of treatment, success of treatment, changes to treatment, notes regarding treatment, etc.

The system 200 may also include a fabrication device 108 and/or a scanning device 107 in electronic communication with the physical processor 130.

Figure 3:
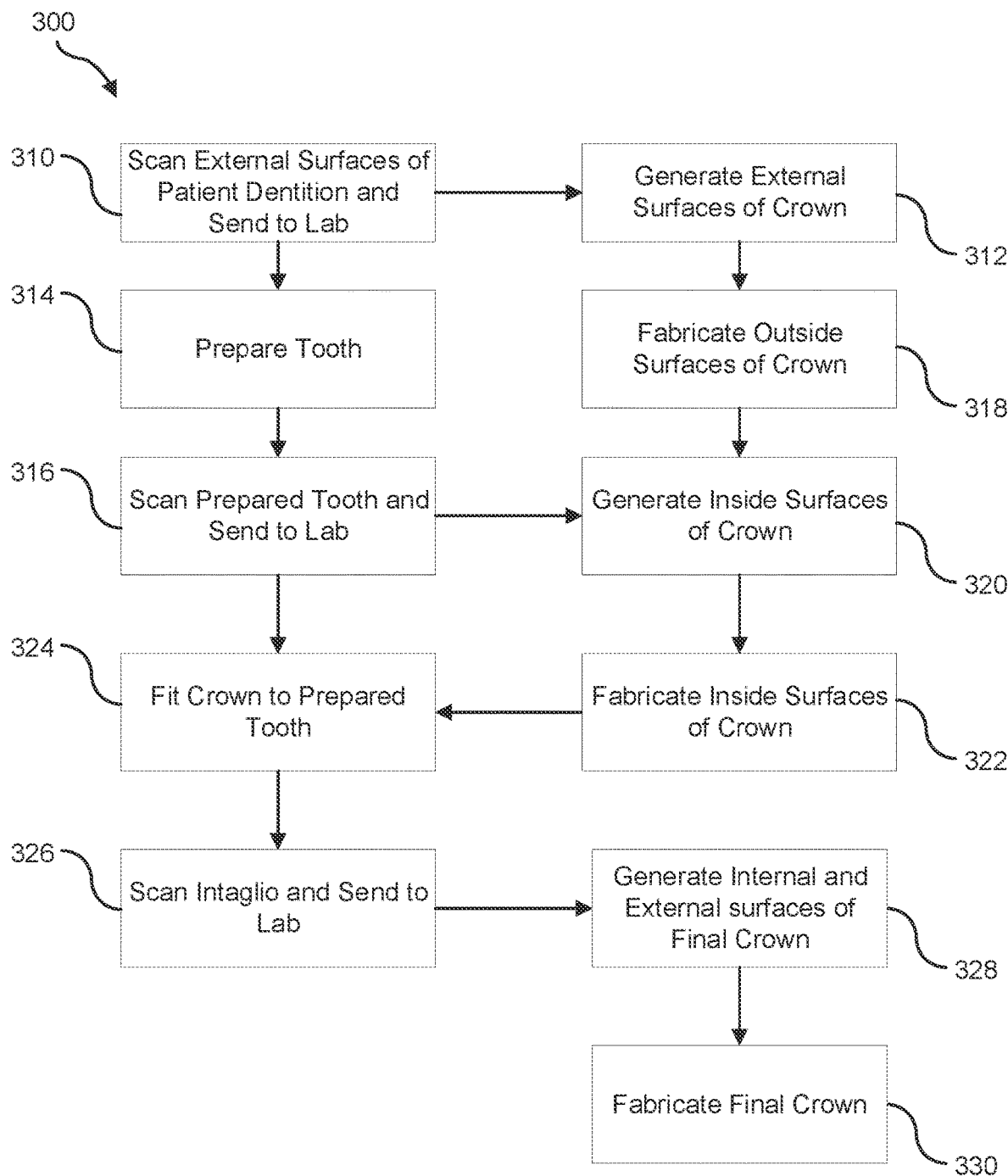
FIG. 3 shows a flow diagram of an example method for designing and fabricating provisional and permanent crowns, in accordance with some embodiments.

FIG. 3 depicts a flow chart showing the process 300 for fabricating a provisional crown and a permanent crown. The process shown in FIG. 3 may be performed by any suitable computer-executable code and/or computing system, including the system(s) illustrated in FIGS. 1, 2, 6, and 7. In one example, each of the steps of the process 300 shown in FIG. 3 may represent an algorithm whose structure includes and/or is represented by multiple sub-steps, examples of which will be provided in greater detail below. The actions or steps associated with the blocks on the left side of FIG. 3, namely blocks 310, 314, 316, 324, 326, may be carried out chair side at a dental office. In some embodiments, the left-side blocks may be carried out with the assistance of, or on, the clinic computing device 105.

The actions or steps associated with the blocks on the right side of FIG. 3, namely blocks 312, 318, 320, 322, 328, 330, may be carried out at a place or location remote to the chair side location. For example, the right-side blocks may be carried out at a dental lab which may be located in the dental office or be remote from the dental office. In some embodiments, the right-side blocks may be carried out with the assistance of, or on, the lab computing device 106.

At block 310, the external surfaces of the patient's dentition are scanned at a dental clinic, such as a dental office, and the resulting scan data is sent to a dental lab. The scanning module 204, which may be located in clinic computing device 105, may be used to carry out the actions of block 310. The actions of block 310 may take place after a dental professional has determined that a patient's tooth should be replaced with a prosthetic, such as a crown.

At block 310, a dental practitioner may use a scanning device, such as scanner 107, attached to or operably connected to clinic computing device 105 to scan the external surfaces of the patient's dentition. The scan may include the tooth, such as a damaged tooth for which a crown is to be fabricated, and the teeth adjacent to the damaged tooth, such as the teeth immediately adjacent to the damaged tooth and the teeth of the opposing jaw that may occlude with the patient's damaged tooth. In some embodiments, the damaged tooth may be damaged to the point that an external surface scan may not be sufficient for generating an external surface of a crown. In such embodiments, at block 310, a dental practitioner may scan a corresponding tooth on an opposite side of the patient's dental arch from the damaged tooth. For example, if the patient's right second bicuspid is the damaged tooth, the dental practitioner may scan the patient left second bicuspid for use in generating the external surfaces of a temporary or permanent crown.

In some embodiments, rather than scan the tooth, the dental professional may select a tooth from an existing database of teeth for use in generating the external surface of the crown. In some embodiments, rather than scan the tooth to be replaced, the dental professional may select or otherwise inform the dental lab of the type of tooth to be replaced, such as by selecting or indicating to the dental lab or dental lab device that tooth is the upper left second bicuspid.

The scan data 224 generated at block 310 may then be sent to the lab computing device 106.

At block 312, the dental lab generates a digital model of the external surfaces of the crown. The exterior crown module 206, which may be located in lab computing device 106, may be used to carry out the actions at block 312. The actions of block 312 may take place during the actions of one or more of block 314 and block 316.

At block 312, the exterior crown module 206 may, in an automated fashion or with the assistance of a dental technician, generate the exterior surface of a temporary or permanent crown. The exterior crown module 206 may generate the exterior surface model of a crown without generating other data such as the exterior surface texture, color, or translucency. In some embodiments, the color of the exterior surface of the temporary crown may be matched to the color of the patient's teeth. At block 312, the exterior crown module 206 receives the scan data generated chair side by the dental professional and then, based on the scan data, generates a three-dimensional model of the exterior surface of a crown. The generated surface may be for a temporary and/or permanent crown. In some embodiments, the exterior crown module 206 may make adjustments to the exterior surface of the crown based on one or more of the scan data 224, patient data 222, the crown requirements 226, and patient treatment data 228, as discussed above. For example, the exterior crown module 206 may take into account the location and shape of the teeth adjacent to the damaged tooth and the teeth that may come in occlusion with the damaged tooth or crown.

At block 312, the reference future module 212 may generate reference features for aligning a permanent or temporary crown with the patient's adjacent teeth and/or teeth of the patient's opposing jaw. The reference features may be generated to be part of the 3D model of the temporary or permanent crown. In some embodiments, the reference features may be generated as a separate 3D model. In some embodiments, the reference future module 212 uses the three-dimensional model of the exterior surface of the permanent or temporary crown to generate a first portion of the reference features and uses the 3D scan data or 3D models of adjacent or opposing teeth to generate a second portion of the reference features. The reference features may match or otherwise meet with the temporary or permanent crown and/or the surfaces of the adjacent or opposing teeth. The reference features may be used to aid in placing the temporary or permanent crown in a predetermined position relative to the patient's adjacent or opposing teeth.

In some embodiments, the reference future module 212 may generate reference features with a cavity that receives cusps of the crown and adjacent teeth to align the crown with the adjacent teeth. In some embodiments, the reference future module 212 may generate reference features with a surface shape that mirrors the surface shape of the occlusal surfaces of the crown and adjacent teeth. In some embodiments, the refence feature module 212 may generate reference features that are separate from the crown. In some embodiments, the reference features may be unitary with the crown and be frangible such that they may be broken away from the crown after the crown is secured to the prepared tooth.

At block 314, the patient's damaged tooth is prepared for receiving a crown. A dental professional may prepare a patient's tooth by cutting or grinding the tooth with a dental bur attached to a dental drill or through the use of other material removal means. The dental professional removes material from the tooth to reduce the crown of the tooth to a desired shape and size for receiving a dental crown. The process of preparing a tooth involves consideration of both the amount of the patient's natural tooth material and crown that should remain in order to support the prosthetic crown and also removing enough material to allow the crown to have a thickness sufficient for withstanding the forces that may be imparted on the crown. In some embodiments, a margin line or shoulder is prepared near or below the gum line of the patient.

In some embodiments, the steps or actions of block 314 may occur during one or more of the steps or actions of block 312 and/or block 318.

At block 316, the external surfaces of the patient's prepared tooth are scanned at the dental clinic and the resulting scan is sent to the dental lab. The scanning module 204, which may be located in clinic computing device 105, may be used to carry out the actions of block 316.

At block 316, a dental practitioner may use a scanning device such as scanner 107 attached to or operably connected to clinic computing device 105 to scan the external surfaces of the patient's prepared tooth. The scan may include the prepared tooth for which a crown is to be fabricated and the teeth adjacent to the prepared tooth, such as the teeth immediately adjacent to the prepared tooth and the teeth of the opposing jaw that may occlude with the patient's damaged tooth.

The scan data 224 generated at block 316 may then be sent to the lab computing device 106. In some embodiments, the steps or actions of block 316 may occur during one or more of the steps or actions of block 312 and/or block 318.

At block 318, the external surfaces of the provisional or temporary crown are fabricated. In some embodiments, the external surfaces of the temporary or permanent crown may be fabricated before receiving a scan or model of the tooth preparation. In some embodiments, the fabrication of the external surfaces of the crown may occur while the tooth is being prepared and scanned, for example, during the steps or actions of block 314 and block 316.

Prior to or during the fabrication of the external surfaces of the crown, the fabrication and instruction module 210 may generate instructions for fabricating external surfaces of the crown based on the external surfaces of the crown that were generated at block 312. The generation of the fabrication instructions occur after generation of the external surfaces of the crown and before fabrication of the external surfaces of the crown.

The fabrication process may be an additive fabrication process carried out by the fabrication machine 108, such as a 3D printer, which may deposit or form material into the shape of the permanent or temporary crown based on the fabrication instructions. In some embodiments, the fabrication process may be a subtractive fabrication process carried out by the fabrication machine 108 which may be a milling machine or other subtractive manufacturing machine that mills or grind material from a blank to form the exterior surface of the temporary or permanent crown.

In some embodiments, the reference features are fabricated at block 318.

At block 320, the dental lab generates a digital model of the internal surfaces of the provisional crown. At block 320 interior crown module 208, which may be located in lab computing device 106, may be used to carry out the actions at block 320.

The interior crown module 208 may generate an interior surface or pocket of the crown based on the new 3D scan and/or model of the surface of the patient's prepared tooth that matches or is a close match to the exterior shape of the patient's prepared tooth. In some embodiments, at block 320 the interior crown module 208 may generate a margin line on the crown based on the new 3D scan and/or model of the patient's prepared tooth that matches or is a close match to the exterior shape of the margin line of the patient's prepared tooth.

The shape of the interior surface or pocket of the crown is generated such that the permanent crown closely matches the shape of the patient's prepared tooth. In some embodiments, the shape of the interior surface or pocket of the crown may be generated with a surface that is offset from the shape of the patient's prepared tooth. The offset may be generated in order to account for adhesive or other bonding material that bonds the permanent or temporary crown to the patient's prepared tooth.

The interior crown module 208 may generate the margin line of the permanent or temporary crown such that the permanent or temporary crown creates a seal with the patient's prepared tooth.

The interior crown module 208 may also take into account the location of the exterior surfaces of adjacent teeth. For example, the interior crown module may take into account the positions of adjacent teeth in order to account for the insertion direction of the crown on to the patient's prepared tooth. Accordingly, the interior surface of the crown may be shaped to allow for insertion of the crown without interference from adjacent teeth. In some embodiments, the interior crown module 208 may account for undercuts by removing the resulting prominences that would otherwise project from the interior surface of the temporary or permanent crown.

At block 322, the internal surfaces of the provisional crown are fabricated. Prior to or during the fabrication of the external surfaces of the crown, the fabrication and instruction module 210 may generate instructions for fabricating the internal surfaces of the crown based on the internal surfaces of the crown that were generated at block 320. The generation of the fabrication instructions occur after generation of the internal surfaces of the crown and before fabrication of the internal surfaces of the crown.

In some embodiments, the fabrication process may be a subtractive fabrication process carried out by the fabrication machine 108 which may be a milling machine or other subtractive manufacturing machine that mills or grind material from a blank with the external surface already formed to form the interior surface of the temporary or permanent crown.

The fabrication process may be an additive fabrication process carried out by the fabrication machine 108, such as a 3D printer, which may deposit or form material into the shape of the permanent or temporary crown based on the fabrication instructions. In embodiments wherein the fabrication machine is an additive fabrication machine, the crown, with its internal and external surfaces may be fabricated after generating the inside and external surfaces and the actions of block 318 may occur at block 322.

In some embodiments, a crown blank with the generated external surface may be fabricated in an additive machining process at block 318 while the internal surface may be fabricated using a subtractive machining process at block 322.

At block 324, the provisional crown is fit onto the prepared tooth. In some embodiments, adhesive is applied to the internal pocket of the crown and the crown is affixed to the prepared tooth.

In some embodiments, rather than immediately affix the crown to the prepared tooth, a dental professional may apply a polymer, such as a curing polymer, for example, PMMA, to the internal pocket of the prepared crown and fit the crown to the patient's prepared tooth. Once the dental professional has fit the crown in the desired location and orientation, the dental professional may wait for the curing polymer to cure. In some embodiments, the dental professional may then remove the crown from the prepared tooth and scan the internal surface, the intaglio, as discussed with respect to block 326.

At block 326, the intaglio of the provisional crown is scanned and the scan data is sent to the dental lab. After fitting the crown to the patient's prepared tooth with the cured polymer, the dental professional may remove the crown from the patient's prepared tooth and scan the intaglio of the crown. In this way, a dental professional may acquire a clean and accurate scan of the internal surface of the crown. This has the advantage of allowing a dental professional to clean and dry the inner surface of the crown before scanning and avoids many of the problems associated with scanning the prepared tooth such as the presence of saliva, blood, and other debris that may obscure the surface of the prepared tooth. This new scan data of the internal surface of the prepared crown may be sent to the dental lab to refine or otherwise update the digital model of the crown.

At block 328, a digital model of the internal and external surfaces of permanent crown are generated. At block 328 the new scan data of the internal surface of the prepared crown may be received.

The interior crown module 208 may generate or update the interior surface or pocket of the crown based on the new 3D scan and/or model of the surface of the intaglio of the crown. In some embodiments, at block 328 the interior crown module 208 may generate a margin line on the crown based on the new 3D scan and/or model of the crown.

The shape of the interior surface or pocket of the crown is generated such that the permanent crown closely matches the shape of the patient's prepared tooth based on the shape of the cured polymer material. In some embodiments, the shape of the interior surface or pocket of the crown may be generated with a surface that is offset from the shape of the patient's prepared tooth. The offset may be generated in order to account for adhesive or other bonding material that bonds the permanent or temporary crown to the patient's prepared tooth.

The interior crown module 208 may generate the margin line of the permanent crown such that the permanent crown creates a seal with the patient's prepared tooth.

The interior crown module 208 may also take into account the location of the exterior surfaces of adjacent teeth. For example, the interior crown module may take into account the positions of adjacent teeth in order to account for the insertion direction of the crown on to the patient's prepared tooth. Accordingly, the interior surface of the crown may be shaped to allow for insertion of the crown without interference from adjacent teeth. In some embodiments, the interior crown module 208 may account for undercuts by removing the resulting prominences that would otherwise project from the interior surface of the temporary or permanent crown.

At block 328, in some embodiments, the exterior crown module 206 generates a color map for the crown. A color map may define the color for one or more locations on the crown.

In some embodiments, the exterior crown module 206 may generate an exterior surface texture for the temporary or permanent crown. The exterior surface texture of a tooth or crown has an effect on surface reflections and other properties of the tooth or crown. In order to produce a crown that matches the patient's existing teeth, the exterior crown module 206 may generate a surface texture as part of the exterior surface model of the crown.

In some embodiments, the exterior crown module 206 may also generate information related to the translucency of the crown. The translucency of the patient's tooth has an effect on how light is absorbed and reflected from the tooth. By matching the translucency of the patient's existing teeth, whether permanent or prosthetic, the exterior crown module 206 may aid in producing a crown that more closely matches the patient's existing teeth. In some embodiments, the exterior crown module 206 generates a translucency map for the crown. A translucency map may define the translucency for one or more locations on the crown.

At block 330, the permanent crown is fabricated. The fabrication and instruction module 210 may generate instructions for fabricating a provisional or permanent crown. In some embodiments, the fabrication and instruction module 210 controls a fabrication machine for fabricating a provisional or permanent crown. In some embodiments, fabrication and instruction module 210 may generate instructions that when read by a fabrication machine because the fabrication machine to fabricate the permanent crown. The instructions may be generated to control the direct fabrication of the permanent crown such as through additive manufacturing, such as 3D printing, or through subtractive manufacturing techniques such as milling or grinding. The instructions may be in a machine and/or human readable format, such as G-code or other computer numerical control programming languages.

Figure 4:
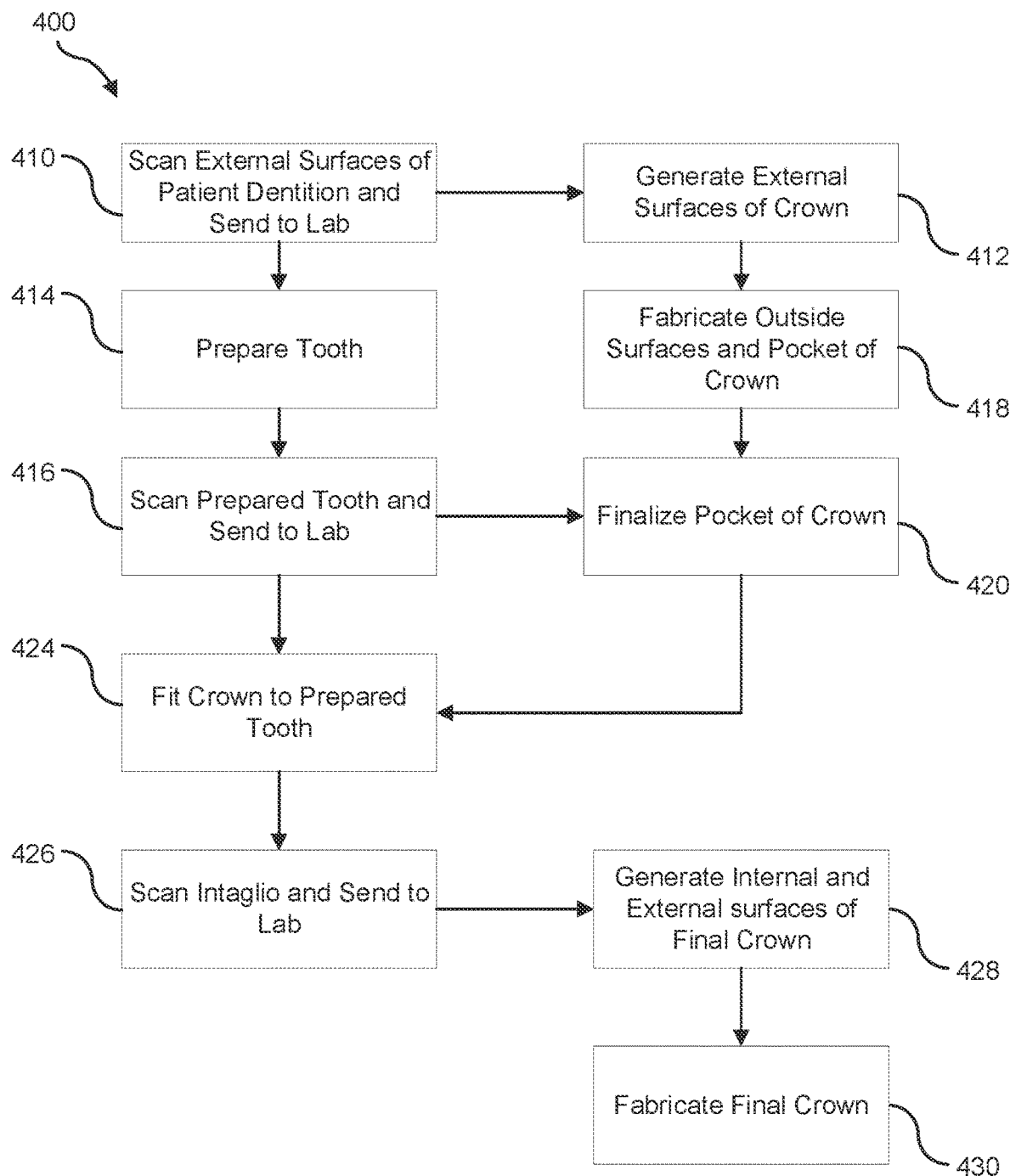
FIG. 4 shows a flow diagram of an example method for designing and fabricating provisional eggshell crowns and permanent crowns, in accordance with some embodiments.

In some embodiments, the fabrication and instruction module may generate instructions for fabricating both the exterior surface and interior surface of the permanent crown based on a 3D model of the permanent crown generated at block 328. In some embodiments, the fabrication and instruction module 210 may generate instructions for fabricating the exterior surface of the permanent crown separately from the instructions for generating the interior surface of the permanent crown. For example, the fabrication and instruction module 210 may generate instructions for fabricating the exterior surface of the permanent or temporary crown based on a 3D model of the of the exterior surface of the crown before the 3D model of the interior surface of the crown has been generated. Then, after the 3D model of the interior surface of the crown has been generated, the fabrication and instruction module 210 may separately generate instructions for fabricating the interior surface of the temporary or permanent crown After fabrication of the final crown, the final crown may be delivered to the dental office and affixed to the patient's prepared tooth In some embodiments, and eggshell crown may be used as a temporary crown. FIG. 4 depicts a flow chart showing the process 400 for fabricating a eggshell crown and a permanent crown. The process shown in FIG. 4 may be performed by any suitable computer-executable code and/or computing system, including the system(s) illustrated in FIGS. 1 and 2. In one example, each of the steps of the process 400 shown in FIG. 4 may represent an algorithm whose structure includes and/or is represented by multiple sub-steps, examples of which will be provided in greater detail below. The actions or steps associated with the blocks on the left side of FIG. 4, namely blocks 410, 414, 416, 424, 426, may be carried out chair side at a dental office. In some embodiments, the left-side blocks may be carried out with the assistance of, or on, the clinic computing device 105.

The actions or steps associated with the blocks on the right side of FIG. 4, namely blocks 412, 418, 420, 428, 430, be carried out at a place or location remote to the chair side location. For example, the right-side blocks may be carried out at a dental lab which may be located in the dental office or be remote from the dental office. In some embodiments, the right-side blocks may be carried out with the assistance of, or on, the lab computing device 106.

At block 410, the external surfaces of the patient's dentition are scanned at a dental clinic, such as a dental office, and the resulting scan data is sent to a dental lab. The scanning module 204, which may be located in clinic computing device 105, may be used to carry out the actions of block 410. The actions of block 410 may take place after a dental professional has determined that a patient's tooth should be replaced with a prosthetic, such as a crown.

At block 410, a dental practitioner may use a scanning device such as scanner 107 attached to or operably connected to clinic computing device 105 to scan the external surfaces of the patient's dentition. The scan may include the tooth, such as a damaged tooth, for which a crown is to be fabricated, and the teeth adjacent to the damaged tooth, such as the teeth immediately adjacent to the damaged tooth and the teeth of the opposing jaw that may occlude with the patient's damaged tooth. In some embodiments, the damaged tooth may be damaged to the point that an external surface scan may not be sufficient for generating an external surface of a crown. In such embodiments, at block 410, a dental practitioner may scan a corresponding tooth on an opposite side of the patient's dental arch from the damaged tooth. For example, if the patient's right second bicuspid is the damaged tooth, the dental practitioner may scan the patient left second bicuspid for use in generating the external surfaces of a eggshell or permanent crown. In some embodiments, rather than scan the tooth, the dental professional may select a tooth from an existing database of teeth for use in generating the external surface the crown. In some embodiments, rather than scan the tooth to be replaced, the dental professional may select or otherwise inform the dental lab of the type of tooth to be replaced, such as by selecting the upper left second bicuspid.

The scan data 224 generated at block 410 may then be sent to the lab computing device 106.

At block 412, the dental lab generates a digital model of the external surfaces of the crown. The exterior crown module 206, which may be located in lab computing device 106, may be used to carry out the actions at block 412. The actions of block 412 may take place during the actions of one or more of block 414 and block 416.

At block 412, the exterior crown module 206 may, in an automated fashion, or with the assistance of a dental technician, generate the exterior surface of a temporary or permanent crown. The exterior crown module 206 may generate the exterior surface model of a crown without generating other data such as exterior surface texture, color, or translucency. In some embodiments, the exterior crown module 206 may make adjustments to the exterior surface of the crown based on one or more of the scan data 224, patient data 222, the crown requirements 226, and patient treatment data 228, as discussed above. For example, the exterior crown module 206 may take into account the location and shape of the teeth adjacent to the damaged tooth and the teeth that may come in occlusion with the damaged tooth or crown.

In some embodiments, for example, when generating an eggshell crown, the inner surface of the crown may be generated at Block 412 before preparation and scanning of a prepared tooth. For example, in some embodiments, the inner surface of the eggshell crown is generated based on the external surface of the crown. For example, the inner surface may be generated based on an offset from the external surface. In some embodiments, the inner surface may be determined based on the type of tooth being replaced.

At block 412, the reference future module 212 may generate reference features for aligning a permanent or temporary crown with the patient's adjacent teeth and/or teeth of the patient's opposing jaw. The reference features may be generated to be part of the 3D model of the temporary or permanent crown. In some embodiments, the reference features may be generated as a separate 3D model. In some embodiments, the reference future module 212 uses the three-dimensional model of the exterior surface of the permanent or temporary crown to generate a first portion of the reference features and uses the 3D scan data or 3D models of adjacent or opposing teeth to generate a second portion of the reference features. The reference features may match or otherwise meet with the temporary or permanent crown and/or the surfaces of the adjacent or opposing teeth.

The reference features may be used to aid in placing the temporary or permanent crown in a predetermined position relative to the patient's adjacent or opposing teeth.

In some embodiments, the reference future module 212 may generate reference features with a cavity that receives cusps of the crown and adjacent teeth to align the crown with the adjacent teeth. In some embodiments, the reference future module 212 may generate reference features with a surface shape that mirrors the surface shape of the occlusal surfaces of the crown and adjacent teeth. In some embodiments, the refence feature module 212 may generate reference features that are separate from the crown. In some embodiments, the reference features may be unitary with the crown and be frangible such that they may be broken away from the crown after the crown is secured to the prepared tooth.

At block 414, the patient's damaged tooth is prepared for receiving a crown. A dental professional may prepare a patient's tooth by cutting or grinding the tooth with dental bur attached to a dental drill or through the use of other material removal means. The dental professional removes material from the tooth to reduce the crown of the tooth to a desired shape and size for receiving a dental crown. In some embodiments, a margin line or shoulder is prepared near or below the gum line of the patient.

In some embodiments, the steps or actions of block 414 may occur during one or more of the steps or actions of block 412 and/or block 418.

At block 416, the external surfaces of the patient's prepared tooth are scanned at the dental clinic and the resulting scan is sent to the dental lab. The scanning module 204, which may be located in clinic computing device 105, may be used to carry out the actions of block 416.

At block 416, a dental practitioner may use a scanning device such as scanner 107 attached to or operably connected to clinic computing device 105 to scan the external surfaces of the patient's prepared tooth. The scan may include the prepared tooth for which a crown is to be fabricated and the teeth adjacent to the prepared tooth, such as the teeth immediately adjacent to the prepared tooth and the teeth of the opposing jaw that may occlude with the patient's damaged tooth.

The scan data 224 generated at block 416 may then be sent to the lab computing device 106. In some embodiments, the steps or actions of block 416 may occur during one or more of the steps or actions of block 412 and/or block 418.

At block 418, the external and internal surfaces of the eggshell crown are fabricated. In some embodiments, the external and internal surfaces of the eggshell crown may be fabricated before receiving a scan for model of the tooth preparation. In some embodiments, the fabrication of the external surfaces of the crown may occur while the tooth is being prepared and scanned, for example, during the steps or actions of block 414 and block 416.

Prior to or during the fabrication of the external surfaces of the crown, the fabrication and instruction module 210 may generate instructions for fabricating external and internal surfaces of the crown based on the external and internal surfaces of the crown that were generated at block 412. The generation of the fabrication instructions occur after generation of the external and internal surfaces of the crown and before fabrication of the external and internal surfaces of the crown.

The fabrication process may be an additive fabrication process or subtractive fabrication process carried out by the fabrication machine 108, as discussed above.

In some embodiments, the reference features are fabricated at block 418.

At block 420, the pockets of the eggshell shown is finalized. In some embodiments, the scan of the prepared tooth is used to confirm that the pocket of the eggshell crown is sufficiently large to not interfere with the prepared tooth. In some embodiments, the eggshell crown is fabricated and pocket is not checked against the scan of the prepared tooth. At block 420 interior crown module 208, which may be located in lab computing device 106, may be used to carry out the actions at block 420.

At block 424, the eggshell crown is fit onto the prepared tooth. In some embodiments, adhesive is applied to the internal pocket of the crown and the crown is affixed to the prepared tooth.

In some embodiments, rather than immediately affix the crown to the prepared tooth, a dental professional may apply a polymer, such as a curing polymer, for example, PMMA, to the internal pocket of the prepared crown and fit the crown to the patient's prepared tooth. Once the dental professional has fit the crown in the desired location and orientation, the dental professional may wait for the curing polymer to cure. In some embodiments, the dental professional may then remove the crown from the prepared tooth and scan the internal surface, the intaglio, as discussed with respect to block 426.

At block 426, the intaglio of the eggshell crown is scanned, the scan data is sent to the dental lab. After fitting the crown to the patient's prepared tooth with the cured polymer, the dental professional may remove the crown from the patient's prepared tooth and scan the intaglio of the crown. In this way, a dental professional may acquire a clean and accurate scan of the internal surface of the crown. This has the advantage of allowing a dental professional to clean and dry the inner surface of the crown before scanning and avoids many of the problems associated with scanning the prepared tooth such as the presence of saliva, blood, and other debris that may obscure the surface of the prepared tooth. This new scan data of the internal surface of the prepared crown may be sent to the dental lab to refine or otherwise update the digital model of the crown.

At block 428, a digital model of the internal and external surfaces of permanent crown are generated. At block 428 the new scan data of the internal surface of the prepared crown may be received.

The interior crown module 208 may generate or update the interior surface or pocket of the crown based on the new 3D scan and/or model of the surface of the intaglio of the crown. In some embodiments, at block 428 the interior crown module 208 may generate a margin line on the crown based on the new 3D scan and/or model of the crown.

The shape of the interior surface or pocket of the crown is generated such that the permanent crown closely matches the shape of the patient's prepared tooth based on the shape of the cured polymer material. In some embodiments, the shape of the interior surface or pocket of the crown may be generated with a surface that is offset from the shape of the patient's prepared tooth. The offset may be generated in order to account for adhesive or other bonding material that bonds the permanent or temporary crown to the patient's prepared tooth.

The interior crown module 208 may generate the margin line of the permanent crown such that the permanent crown creates a seal with the patient's prepared tooth.

The interior crown module 208 may also take into account the location of the exterior surfaces of adjacent teeth. For example, the interior crown module may take into account the positions of adjacent teeth in order to account for the insertion direction of the crown on to the patient's prepared tooth. Accordingly, the interior surface of the crown may be shaped to allow for insertion of the crown without interference from adjacent teeth. In some embodiments, the interior crown module 208 may account for undercuts by removing the resulting prominences that would otherwise project from the interior surface of the temporary or permanent crown.

At block 428, in some embodiments, the exterior crown module 206 generates a color map for the crown. A color map may define the color for one or more locations on the crown.

In some embodiments, the exterior crown module 206 may generate an exterior surface texture for the temporary or permanent crown. The exterior surface texture of a tooth or crown has an effect on surface reflections and other properties of the tooth or crown. In order to produce a crown that matches the patient's existing teeth, the exterior crown module 206 may generate a surface texture as part of the exterior surface model of the crown.

In some embodiments, the exterior crown module 206 may also generate information related to the translucency of the crown. The translucency of the patient's tooth has an effect on how light is absorbed and reflected from the tooth. By matching the translucency of the patient's existing teeth, whether permanent or prosthetic, the exterior crown module 206 may aid in producing a crown that more closely matches the patient's existing teeth. In some embodiments, the exterior crown module 206 generates a translucency map for the crown. A translucency map may define the translucency for one or more locations on the crown.

At block 430, the permanent crown is fabricated. The fabrication and instruction module 210 may generate instructions for fabricating an eggshell or permanent crown. In some embodiments, the fabrication and instruction module 210 controls a fabrication machine for fabricating an eggshell or permanent crown. In some embodiments, fabrication and instruction module 210 may generate instructions that when read by a fabrication machine cause the fabrication machine to fabricate the permanent crown. The instructions may be generated to control the direct fabrication of the permanent crown such as through additive manufacturing, such as 3D printing, or through subtractive manufacturing techniques such as milling or grinding. The instructions may be in a machine and/or human readable format, such as G-code or other computer numerical control programming languages.

Figure 5:
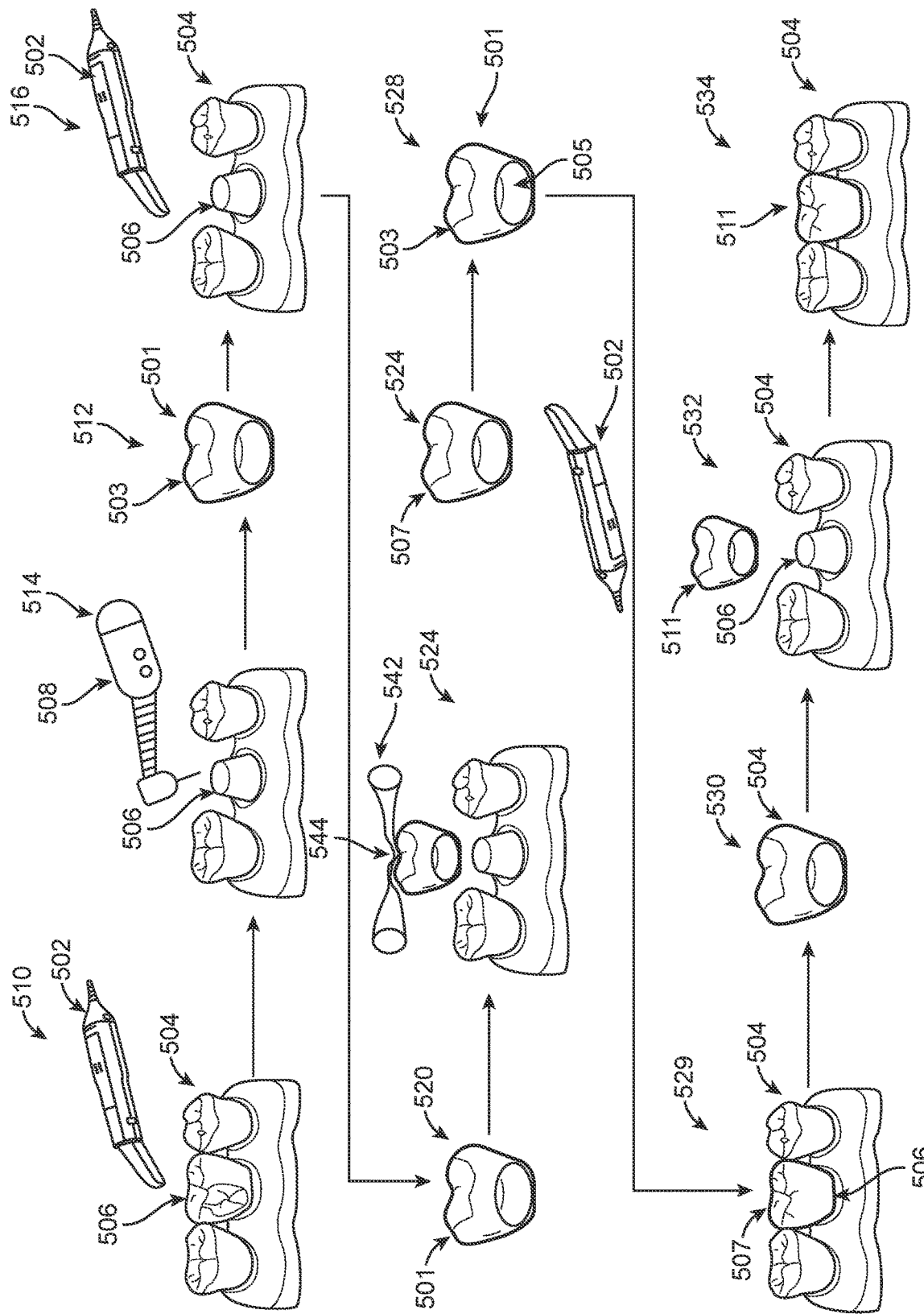
FIG. 5 depicts the steps of an example method for designing and fabricating provisional eggshell crowns and permanent crowns, in accordance with some embodiments.

In some embodiments, the fabrication and instruction module may generate instructions for fabricating both the exterior surface and interior surface of the permanent crown based on a 3D model of the permanent crown generated at block 428. In some embodiments, the fabrication and instruction module 210 may generate instructions for fabricating the exterior surface of the permanent crown separately from the instructions for generating the interior surface of the permanent crown. For example, the fabrication and instruction module 210 may generate instructions for fabricating the exterior surface of the permanent or temporary crown based on a 3D model of the of the exterior surface of the crown before the 3D model of the interior surface of the crown has been generated. Then, after the 3D model of the interior surface of the crown has been generated, the fabrication and instruction module 210 may separately generate instructions for fabricating the interior surface of the temporary or permanent crown After fabrication of the final crown, the final crown may be delivered to the dental office and affixed to the patient's prepared tooth FIG. 5 is a flow diagram that depicts the actions for fabricating a temporary crown, temporarily eggshell crown, and a permanent crown, as described with respect to FIGS. 3 and 4, for example.

At depiction 510, the external surfaces of the patient's dentition are scanned at a dental clinic and the resulting scan data is sent to a dental lab. At depiction 510, a handheld intraoral scanner 502 scans the patient's dentition 504 and in particular the patient's damaged tooth 506. During this process, a dental practitioner holds a handheld scanner 502 and moves the scanner's probe relative to the patient's dentition to capture the surface details of the patient's dentition and to generate a three-dimensional model of the patient's dentition 504 and damaged tooth 506. Depiction 510 may show the process described above at blocks 310, 410.

At depiction 514, the patient's tooth or teeth are prepared for receiving a crown. At depiction 514, a dental tool 508 such as a drill detached burger may prepare the patient's tooth 506 by removing material from the patient's tooth 506. During this process, a margin line is formed on prepared tooth 506. Depiction 514 may show the process described above at blocks 314, 414.

At depiction 512, the dental lab generates a digital model of the external surfaces of the crown. At depiction 512, the external surface 503 of a digital model of a provisional or permanent crown 501 is generated. Depiction 512 may show the process described above at blocks 312, 412.

At depiction 516, the external surfaces of the patient's prepared tooth are scanned at the dental clinic and the resulting scan is sent to the dental lab. At depiction 516, a handheld intraoral scanner 502 scans the patient's dentition 504 and in particular the patient's prepared tooth 506. During this process a dental practitioner holds a handheld scanner 502 and moves the scanner's probe relative to the patient's dentition capture surface details of the patient's dentition and to generate a three-dimensional model of the patient's dentition 504 and prepared tooth 506. Depiction 516 may show the process described above at blocks 316, 416.

At depiction 520, the dental lab generates a digital model of the internal surfaces of the provisional crown. At depiction 520 the internal surfaces 505 of a digital model of a temporary or permanent crown 501 or generated based on the scan data generated at depiction 516. Depiction 520 may show the process described above at blocks 320, 420.

At depiction 524, the provisional crown is fit onto the prepared tooth. At depiction 524, the provisional crown 507 is fit onto the prepared tooth 506 of the patient's dentition 504. Depiction 524 may show the process described above at blocks 324, 424. For example, a fixture 544 may be used to fit the crown. The fixture may include reference features 542 for aligning a permanent or temporary crown with the patient's adjacent teeth and/or teeth of the patient's opposing jaw. The reference features 542 may be fabricated as part of the temporary or permanent crown. In some embodiments, the reference features may be fabricated separate from the crown. In some embodiments, the reference future module 212 uses the three-dimensional model of the exterior surface of the permanent or temporary crown to generate a first portion of the reference features and uses the 3D scan data or 3D models of adjacent or opposing teeth to generate a second portion of the reference features, as discussed herein. The reference features may match or otherwise meet with the temporary or permanent crown and/or the surfaces of the adjacent or opposing teeth. The reference features may be used to aid in placing the temporary or permanent crown in a predetermined position relative to the patient's adjacent or opposing teeth.

In some embodiments, the reference futures may include reference features with a cavity that receives cusps of the crown and adjacent teeth to align the crown with the adjacent teeth. In some embodiments, the reference features have a surface shape that mirrors the surface shape of the occlusal surfaces of the crown and adjacent teeth. In some embodiments, the reference features are separate from the crown. In some embodiments, the reference features may be unitary with the crown and be frangible such that they may be broken away from the crown after the crown is secured to the prepared tooth.

At depiction 526, the intaglio of the provisional crown is scanned and the scan data is sent to the dental lab. At depiction 526, the provisional crown 507 is removed from the prepared tooth 506 and a dental professional scans the intaglio of the provisional crown 507 with a handheld scanner 5022 generate scan data of the internal surface of the provisional crown 507. Depiction 526 may show the process described above at blocks 326, 426.

At depiction 528, a digital model of the internal and external surfaces of permanent crown are generated. At depiction 508, the digital model 501, of the crown is updated based on the scan data of the intaglio of the provisional crown. At depiction 528, the external surface 503, internal surface 505, or both are updated based on the scan data. Depiction 528 may show the process described above at block 328, 428.

At depiction 529, the temporary crown 507 is affixed to the prepared tooth 506 of the patient's dentition 504.

At depiction 530, the permanent crown 509 is fabricated. The permanent crown 509 may be fabricated as discussed above at blocks 330, 430.

At depiction 532, the permanent crown 511 is affixed to the prepared tooth 506 of the patient's dentition 504.

At depiction 534, the permanent crown process may be completed with the permanent crown 511 affixed to the patient's dentition 504.

Computing System

Figure 6:
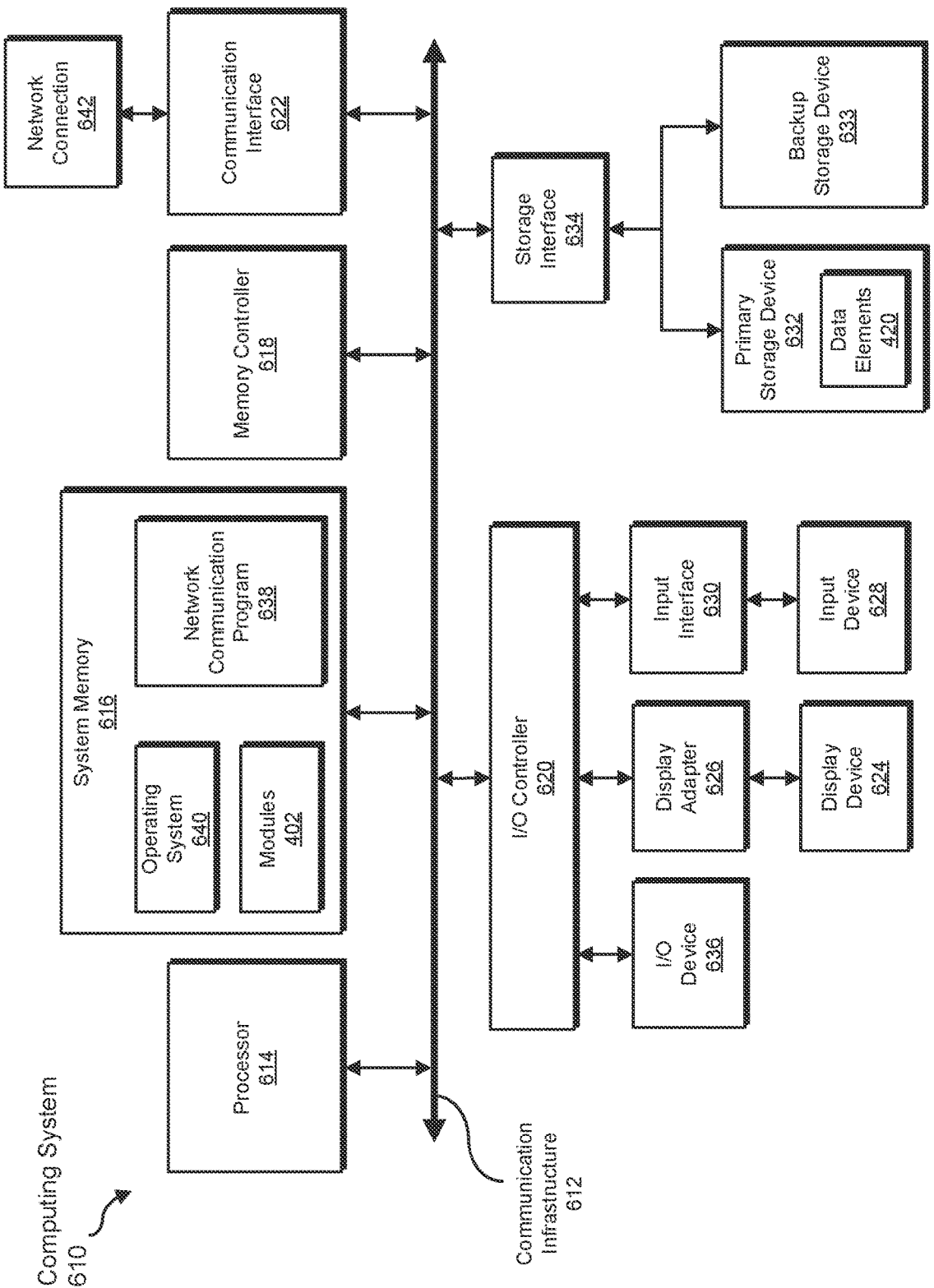
FIG. 6 shows a block diagram of an example computing system capable of implementing one or more embodiments described and/or illustrated herein, in accordance with some embodiments.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 5). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, additional elements 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
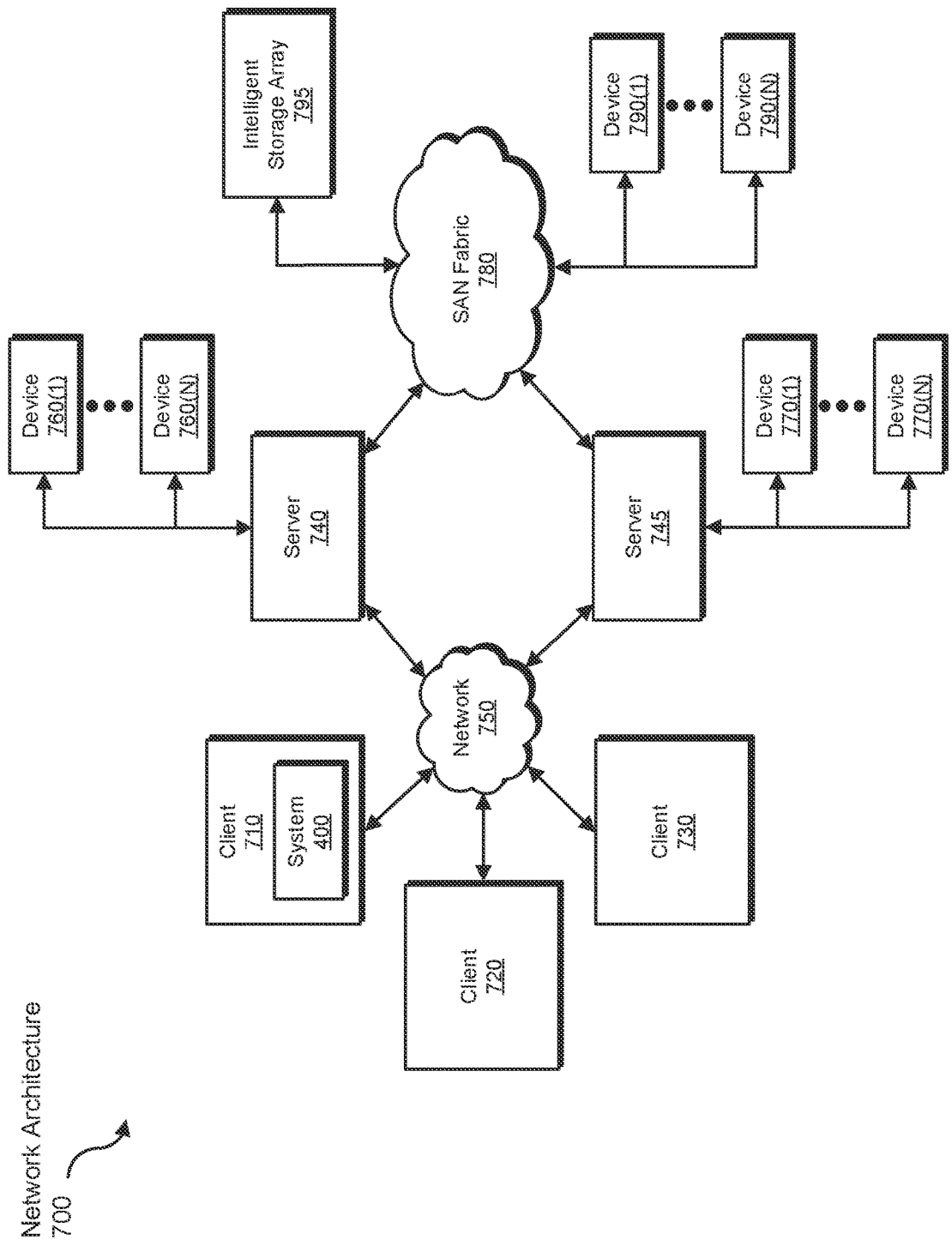
FIG. 7 shows a block diagram of an example computing network capable of implementing one or more of the embodiments described and/or illustrated herein, in accordance with some embodiments.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 5). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for virtual care.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

As described herein, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

The processor as described herein can be configured to perform one or more steps of any method disclosed herein. Alternatively or in combination, the processor can be configured to combine one or more steps of one or more methods as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising.

The processor as disclosed herein can be configured with instructions to perform any one or more steps of any method as disclosed herein.

It will be understood that although the terms "first," "second," "third", etc. may be used herein to describe various layers, elements, components, regions or sections without referring to any particular order or sequence of events. These terms are merely used to distinguish one layer, element, component, region or section from another layer, element, component, region or section. A first layer, element, component, region or section as described herein could be referred to as a second layer, element, component, region or section without departing from the teachings of the present disclosure.

As used herein, the term "or" is used inclusively to refer items in the alternative and in combination.

As used herein, characters such as numerals refer to like elements.

The present disclosure includes the following numbered clauses.

Clause 1. A method for preparing a tooth crown, the method comprising: generating a 3D model of an external surface of a patient's tooth; generating a 3D model of an external surface of a first crown based on the model of the external surface of the patient's tooth; preparing the patient's tooth to receive the first crown while generating the 3D model of the external surface; generating a 3D model of the prepared tooth; generating a 3D model of an internal surface of the first crown, wherein the 3D model of the external surface and the 3D model of the internal surface form a 3D model of the first crown.

Clause 2. The method of clause 1, wherein generating the 3D model of the external surface includes scanning an external surface of the patient's tooth.

Clause 3. The method of clause 1, wherein generating the 3D model of the external surface includes scanning an external surface of a corresponding tooth of the patient on an opposite side of a patient's arch relative to the patient's tooth.

Clause 4. The method of clause 1, further comprising: fabricating the first crown.

Clause 5. The method of clause 4, wherein fabricating includes: fabricating an external surface of the first crown while the patient's tooth is prepared.

Clause 6. The method of clause 4, wherein fabricating includes: fabricating an internal surface of the first crown.

Clause 7. The method of clause 4, further comprising: fitting the first crown to the prepared tooth; and scanning the physical inner surface of the first crown after fitting the first crown to the prepared tooth to generate a 3D model of the physical inner surface of the first crown.

Clause 8. The method of clause 7, further comprising: updating the 3D model of the first crown based on the 3D model of the physical inner surface of the first crown.

Clause 9. The method of clause 8, further comprising: generating instructions for fabricating a second crown based on the updated 3D model of the first crown.

Clause 10. The method of clause 9, wherein the first crown is a temporary crown and the second crown is a permanent crown.

Clause 11. A method for preparing a tooth crown, the method comprising: generating a 3D model of an external surface of a patient's tooth; generating a 3D model of an external surface of a first crown based on the model of the external surface of the patient's tooth; generating a 3D model of an internal surface of the first crown; preparing the patient's tooth to receive the first crown while generating the 3D model of the external surface; fitting a physical first crown to the patient's tooth; generating a 3D model of the internal surface of the physical first crown, wherein a 3D model of a second crown is based on the 3D model of the internal surface of the physical first crown and the 3D model of the external surface of the first crown; generating instructions for fabricating a physical second crown based on the 3D model of a second crown.

Clause 12. The method of clause 11, wherein generating the 3D model of the external surface includes scanning an external surface of the patient's tooth.

Clause 13. The method of clause 11, wherein generating the 3D model of the external surface includes scanning an external surface of a corresponding tooth of the patient on an opposite side of a patient's arch relative to the patient's tooth.

Clause 14. The method of clause 11, further comprising: generating instructions for fabricating the first crown.

Clause 15. The method of clause 14, wherein fabricating includes: fabricating an external surface of the first crown while the patient's tooth is prepared.

Clause 16. The method of clause 14, wherein fabricating includes: fabricating an internal surface of the first crown.

Clause 17. The method of clause 11, further comprising: updating the 3D model of the first crown based on the 3D model of the physical inner surface of the first crown.

Clause 18. The method of clause 11, further comprising: fabricating a physical second crown based on the 3D model of the second crown.

Clause 19. The method of clause 18, wherein the first crown is an eggshell crown and the second crown is a permanent crown.

Clause 20. The method of clause 11, wherein the 3D model of the internal surface of the first crown is based on the 3D model of the external surface of the first crown.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof

What is claimed is:

1. A system for preparing a tooth crown, the system comprising:
    an intraoral scanner;
    non-transitory computer readable medium with instruction that, when executed by a processor, cause the system to carry out a method, the method including:
    receiving scan data of a three-dimensional (3D) model of an external surface of a patient's tooth using the intraoral scanner;
    generating a 3D model of an external surface of a first crown based on the scan data of the external surface of the patient's tooth;
    generating a 3D model of an internal surface of the first crown;
    outputting instructions to fabricate a physical first crown based on the 3D model of the external surface of the first crown and the 3D model of the internal surface of the first crown while the patient's tooth is being prepared to receive the first crown;
    generating a 3D model of the internal surface of the physical first crown after fitting the physical first crown to the patient's tooth, wherein a 3D model of a second crown is based on the 3D model of the internal surface of the physical first crown and the 3D model of the external surface of the first crown;
    generating instructions for fabricating a physical second crown based on the 3D model of a second crown.

2. The system of claim 1, further comprising:
    combining the 3D model of the external surface of the first crown and the 3D model of the internal surface of the first physical crown to generate the 3D model of the first second crown.

3. The system of claim 1, wherein generating the 3D model of the internal surface of the physical first crown uses scan data of the internal surface of the physical first crown generated using the intraoral scanner.

4. The system of claim 1, wherein generating the 3D model of the external surface includes receiving scan data of an external surface of a corresponding tooth of the patient on an opposite side of the patient's arch relative to the patient's tooth.

5. The system of claim 1, further comprising:
    generating the instructions for fabricating the first physical crown.

6. The system of claim 5, further comprising:
    a fabrication machine, and wherein fabricating includes:
    fabricating an external surface of the physical first crown while the patient's tooth is prepared.

7. The system of claim 5, wherein fabricating includes:
    fabricating an internal surface of the physical first crown.

8. The system of claim 1, further comprising:
    updating the 3D model of the first crown based on the 3D model of the inner surface of the first crown.

9. The system of claim 1, further comprising:
    fabricating the physical second crown based on the 3D model of the second crown.

10. The system of claim 9, wherein the first crown is an eggshell crown and the second crown is a permanent crown.

11. The system of claim 1, wherein the 3D model of the internal surface of the first crown is based on the 3D model of the external surface of the first crown.

12. The system of claim 1, wherein the first physical crown is an eggshell crown.

13. The system of claim 12, wherein generating the 3D model of the internal surface of the physical first crown uses scan data of the internal surface of the physical first crown generated using the intraoral scanner.

14. The system of claim 13, wherein the scan data of the internal surface of the physical first crown includes scan data of a polymer within the first physical crown.

15. The system of claim 14, wherein the polymer is a cured polymer.

16. The system of claim 15, wherein the second crown is a permanent crown.

17. A system for preparing a tooth crown, the system comprising:
    a non-transitory computing device readable medium storing instructions executable by a processor to cause a computing device to perform a method, the method including:
    receiving scan data of a three-dimensional (3D) model of an external surface of a patient's tooth using an intraoral scanner;
    generating a 3D model of an external surface of a first crown based on the scan data of the external surface of the patient's tooth;
    generating a 3D model of an internal surface of the first crown;
    outputting instructions to fabricate a physical first crown based on the 3D model of the external surface of the first crown and the 3D model of the internal surface of the first crown while the patient's tooth is being prepared to receive the first crown;
    generating a 3D model of the internal surface of the physical first crown after fitting the physical first crown to the patient's tooth, wherein a 3D model of a second crown is based on the 3D model of the internal surface of the physical first crown and the 3D model of the external surface of the first crown;

generating instructions for fabricating a physical second crown based on the 3D model of a second crown.

18. The system of claim 17, further comprising:

combining the 3D model of the external surface of the first crown and the 3D model of the internal surface of the first crown an external surface of a patient's tooth to generate a 3D model of the first crown.

19. The system of claim 17, wherein generating the 3D model of the internal surface of the physical first crown uses scan data of the internal surface of the physical first crown generated using the intraoral scanner.

20. The system of claim 17, wherein generating the 3D model of the external surface includes receiving scan data of an external surface of a corresponding tooth of the patient on an opposite side of the patient's arch relative to the patient's tooth.

\* \* \* \* \*